United States Patent Office 3,811,985
Patented May 21, 1974

3,811,985
METHOD FOR MAKING PRICE SHIELDS OR THE LIKE
Max Lehner-Stirnemann, Hauptstrasse 1001, CH–5722, Granichen, Switzerland
Filed Jan. 27, 1971, Ser. No. 110,159
Claims priority, application Switzerland, Feb. 2, 1970, 1,451/70
Int. Cl. B65c 9/14, 9/20, 11/02
U.S. Cl. 156—277                              4 Claims

ABSTRACT OF THE DISCLOSURE

There is disclosed a method and apparatus for fabricating price shields or the like which consist of a price tag or label printed by a balance or weighing device and a label support or carrier, which is manifested by the features that individual label carriers are brought into the region of a price label-delivery location and at such location retained in a holder until a price label has been printed out by the balance or weighing device and delivered to this delivery location. Thereafter the label support or carrier and the price label itself are guided towards one another and by being pressed against one another united, and the thus formed price shield is then ejected.

BACKGROUND OF THE INVENTION

The present invention relates to a new and improved method of, and apparatus for the fabrication of price shields or the like composed of a label support of carrier and price tag or label printed by a balance or weighing device.

Balances or weighing devices for weighing out foodstuffs, such as meat, cheese, vegetables and the like are already known to the art which are of the type where the unit price, the weight of the weighed-out foodstuff and the calculated price of this foodstuff is printed onto a price tag or label and this label is then guided along a heating element arranged laterally of the balance of scale. The heating element serves to activate an adhesive layer located at the rear face of the price tag or label so that the packaged and weighed foodstuff need only be pressed againth this adhesive layer, whereupon the goods only then need be provided with the required selling date. However, there are some types of materials which cannot be packaged when sold and where it is not possible or feasible to apply the price tag to the goods themselves. Banana bushels or bunches, for instance, represent one such type of goods, as do also winter vegetables, for instance cauliflower, and in this context there might also be mentioned foodstuffts which are packaged in netting, such as for example potatoes, citrus fruits and the like. In such case, resort is made to the use of label or tag supports which, for instance, in the case of banana bushels are formed at the holders which enable hanging up the banana bushels at a stand or frame during sale thereof. These label supports or carriers typically possess a planar surface at which there is adhesively bonded the price tag or label as well as further possessing suitably constructed attachment means in order to secure such a price shield formed from two parts, namely from the tag or label carrier or support and the label or tag itself, to the goods. Previously the connection of the label carrier and the price label with one another was undertaken manually and the label carriers were generally delivered as bulk goods.

SUMMARY OF THE INVENTION

Accordingly, there is still present a real need in the art for the fabrication of price shields or the like consisting of a label carrier and the label in a rational and automatic fashion. Therefore, a primary objective of the present invention is to provide an improved method of, and apparatus for, economically, reliably and rationally fabricating such type price shields.

Another and more specific object of the present invention relates to an improved method of, and apparatus for, the fabrication of such known types of price shields in an automatic and rational manner, especially in such a way that a person in the direct neighborhood of the goods which have just been weighed and which are to be applied with a price shield receives a finished price shield for such goods and need only attach such price shield.

Still a further significant object of the present invention relates to an improved apparatus for the fabrication of price shields of the aforementioned type which is designed such that upon the absence of a price tag or label the apparatus is brought to a standstill and renders possible carrying out the conventional technique where the price tag or label is directly adhesively applied to the goods.

Now, in order to implement these and still further objects of the invention, which will become more readily apparent as the description proceeds, the inventive method for the fabrication of price shields or the like consisting of a price tag or label printed by a balance or weighing device and a tag or label support contemplates that the label carrier or support is individually brought to the region of a price label-delivery location and at that location retained in a holder until a price label has been printed-out by the balance and delivered to this delivery location. Thereafter the label support and the price label are guided towards one another and by being pressed against one another attached with one another, and thereafter the thus formed price shield is ejected.

The inventive apparatus for the performance of the aforesaid method aspects of this invention comprises mechanism for delivery of individual label supports or carriers to the bonding location of the price tags or labels printed by the balance or weighing device, this mechanism being displaceably guided at a leg of a substantially U-shaped frame in the direction of the height of such leg and pivotable about an axis. At the other leg of the frame there is provided a support surface for the balance, the space between the aforementioned legs serving to accommodate or receive this balance or weighing device. Additionally, the support surface is equipped with a mechanical or photoelectric barrier which prevents conveying of a label support to the bonding location when there is absent a price label or tag at this location.

By means of the inventive apparatus it is possible to quickly displace or rock the mechanism for delivering the label supports to the bonding location for the price tags or labels printed by the balance or weighing device, out of the operable zone of this bonding location by performing simple manual operations and without resorting to the use of tools, thereby freeing the bonding location. This constitutes a considerable advantage of the invention since under those circumstances the balance or weighing device can also then be used in those instances where it is possible to provide the goods directly with a printed-out price tag or label without resorting to the use of a label support or carrier in that the goods themselves are directly delivered to the bonding location. Similarly, by performing this manipulation the bonding location is rendered accessible for often occurring times requiring cleaning of glue or adhesive residues and possibly residual portions of the labels.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Describing now the drawings, in FIGS. 1 to 6 inclusive there is depicted a device or mechanism for the delivery of label carriers or supports to a bonding location 1 for the nonillustrated price tags or labels which are printed by the balance or weighing device 2 illustrated schematically in phantom lines. This mechanism will be seen to embody a magazine 3, a mechanical control device 5 driven by an electric motor 4, and a suction lifting mechanism 6 for conveying individual label carriers or supports from the magazine 3 to the bonding or attachment location 1.

Figure 1:
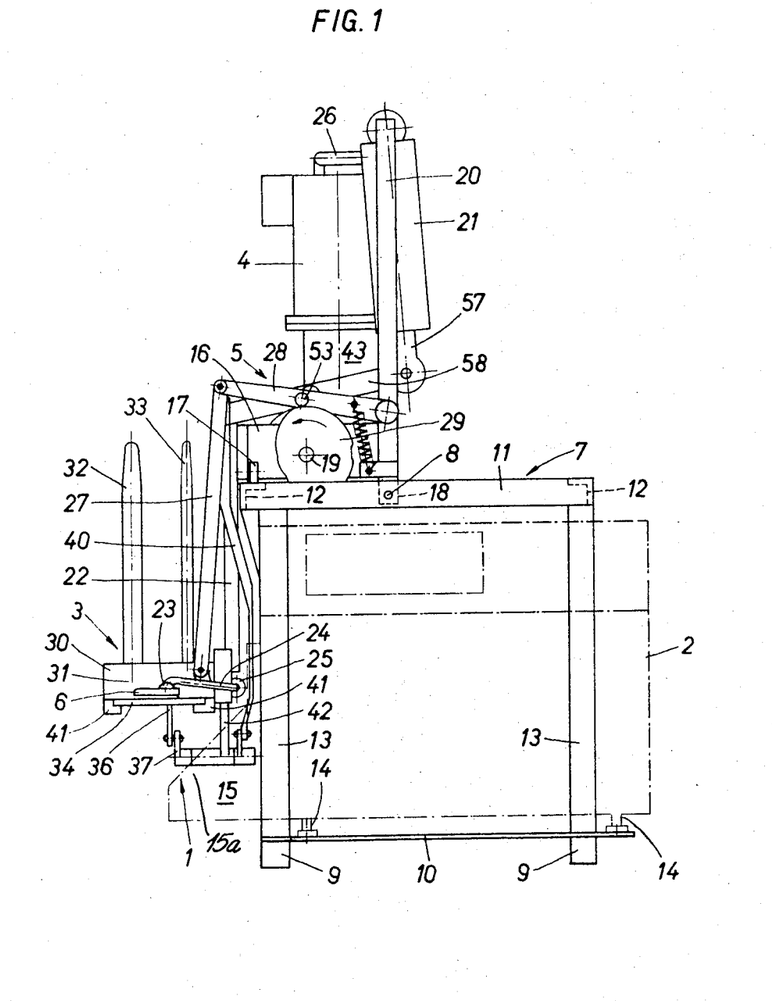
FIG. 1 is a side view of a preferred embodiment of inventive apparatus including mechanism for delivery of the label carriers or supports to the bonding location of the price tags or labels printed by a balance or weighing device which has been schematically shown in phantom lines.

The mechanism incorporating the above-mentioned components is arranged for pivotable movement about a shaft member 8 at a substantially U-shaped frame unit 7 extending perpendicular to the plane of the drawing of FIG. 1. In FIG. 1, there is visible the open end or side of the U-shaped frame unit 7. One leg or leg portion of this frame unit 7 is formed by the rod members 9, of which only a respective end face thereof is visible. Both of these rod members 9 are held in spaced relationship from one another by a support plate 10 for the balance or weighing device 2. The other leg or leg portion of the frame unit 7 is formed by a frame member, of which only a front ledge 11 is visible. This ledge 11 and the rearward non-visible ledge are held in spaced relationship from one another by two angle profile members 12. The aforementioned frame and the rod members 9 are coupled with one another by means of two transverse elements 13 so that the balance 2 can be easily placed upon the support plate 10 and can be exactly horizontally adjusted with the aid of the adjusting screws 14.

At the left side of the balance or weighing device 2, as viewed in the illustration of FIG. 1, there is provided an attachment 15 equipped with a suitable heating element, schematically referenced at 15a, at the bonding or attachment location 1 along which slides the printed price tag or label after the weighing operation has been completed. Now, it is the function of the mechanism equipped with the suction lifting device 6 to successively press the label carriers or supports against the labels located upon or at the bonding location 1 and again to raise such therefrom.

The previously considered control device 5 will be seen to embody a carriage 16 equipped with a pair of travelling rollers 17 which can roll upon one of the angle profile members 12. At the side of the carriage 16 located opposite these rollers 17 there is provided a collar or bracket 18 which engages about the shaft 8 and slides along such shaft. Consequently, carriage 16 can be displaced in the lengthwise direction of the angle profile members 12 and be rocked or pivoted about the shaft member 8.

Further, at the carriage 16 there is mounted a cam shaft member 19 which is directed parallel to the angle profile member 12. Cam shaft member 19 has arranged thereon five cams, the function of which will be described more fully hereinafter. This carriage 16 will be seen to carry an upwardly directed retaining or holding rod 20, at the upper end of which there is arranged a piston pump unit 21 for the purpose of generating the vacuum required for operating the suction lifting device 6. At the other side of the carriage 16 there is attached to the carriage itself a downwardly directed guide rod 22 which protrudes past carriage 16. At the lower free end of this guide rod 22, there is detachably secured the magazine 3 for the nonillustrated label carriers or supports.

The suction lifting device 6 is operatively coupled through the agency of a connection means 23, such as a ball-and-socket joint, with the free end of an actuation arm member 24, so that the suction lifting device 6 can be brought to bear exactly parallel to and upon the surface of the bonding or attachment location 1. The actuation arm member 24 is pivotably supported in a bearing 25 and additionally is designed to possess a hollow construction. The hollow space within the hollow actuation arm member 24 is operatively coupled via a flexible hose conduit 26, only partially shown in the drawings, with the output side or delivery side of the piston pump unit 21.

The actuation arm member 24 is driven by means of a suction lifting cam member 29 through the agency of a rod 27 pivotably connected with the actuation arm member and via a lever arm 28, the one end of which is pivotably secured to the holder or retaining rod 20.

Figure 2:
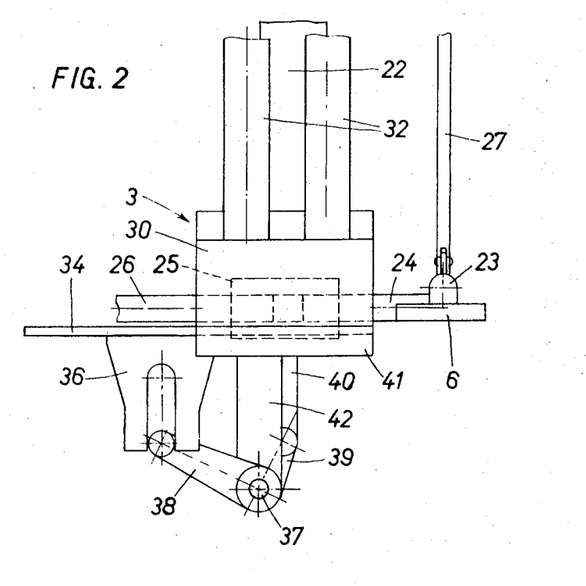
FIG. 2 is a front view of a portion of the mechanism depicted in FIG. 1 incorporating a magazine for the label support.
Figure 3:
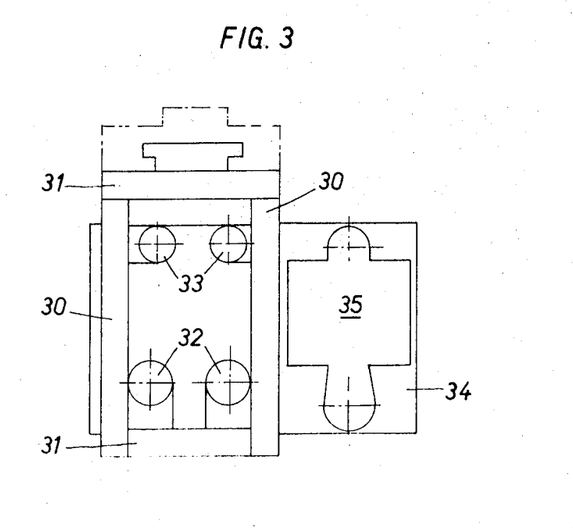
FIG. 3 illustrates in top plan view the magazine construction of the arrangement of FIG. 2, individual components thereof being shown in a different position.

FIG. 2 illustrates a front view of the magazine 3 for the label supports or carriers together with the suction lifting device 6 on an enlarged scale in comparison to the showing of FIG. 1, while FIG. 3 is a top view of the magazine. It will be seen that extending upwardly and outwardly from within a box or compartment formed by the lengthwise walls 30 and the transverse walls 31 are two thicker bolt or rod members 32 and two thinner rod or bolt members 33. Between these guide bolts 32 and 33, there can be stacked the label or tag supports, whereby in each case the lowermost label carrier or support of the stack bears upon a substantially plate-shaped slide member 34 arranged at the underside of the aforementioned compartment.

FIG. 2 illustrates this slide member 34 in its starting position and FIG. 3 illustrates the same slide member 34 in its working position. At the upper face of the slide member 34 there is provided a recess 35 configured to correspond to the contour of the label carrier or support. If the slide member 34 is located in the position depicted in FIG. 2, then, it is possible for a label support to move into the recess 35 so that this label support can be displaced out of the magazine or supply means 3 when the slide member 34 has been displaced into its working or operable position. Displacement thereof into this working or operable position occurs through the agency of a bifurcated or forked member 36 secured to the underface of the slide member 3, a first lever member 38 coupled with a shaft 37, a second lever 39 likewise coupled with this shaft 37, and a multiple-flexed rod member 40 which is driven by the control device 5. The slide member 34 is retained by two ledge members 41 arranged at the underside of the above-mentioned compartment or box and which ledge members possess a substantially L-shaped cross-sectional configuration. The shaft member 37 is mounted in an extension 42 which protrudes past the underside of the aforementioned box or compartment.

Figure 4:
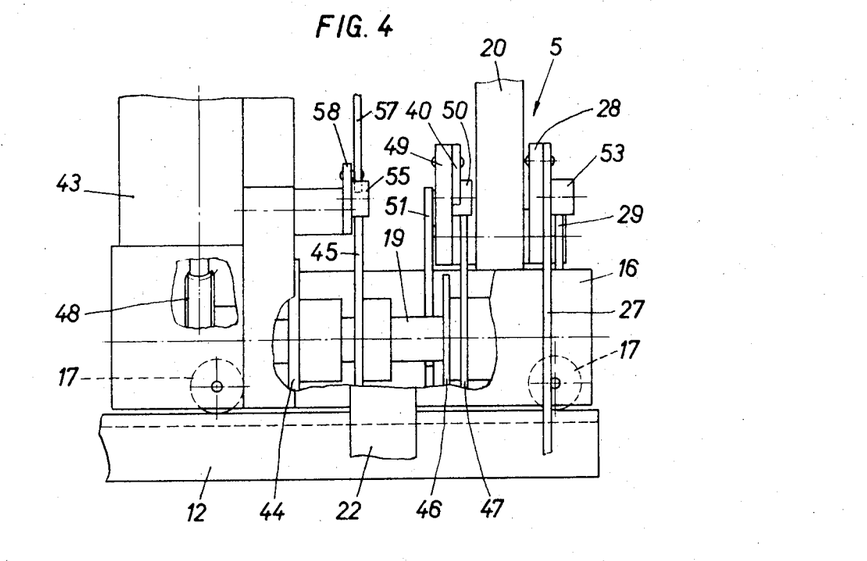
FIG. 4 is a front view of a different portion of the mechanism illustrating details of the mechanical control device.
Figure 5:
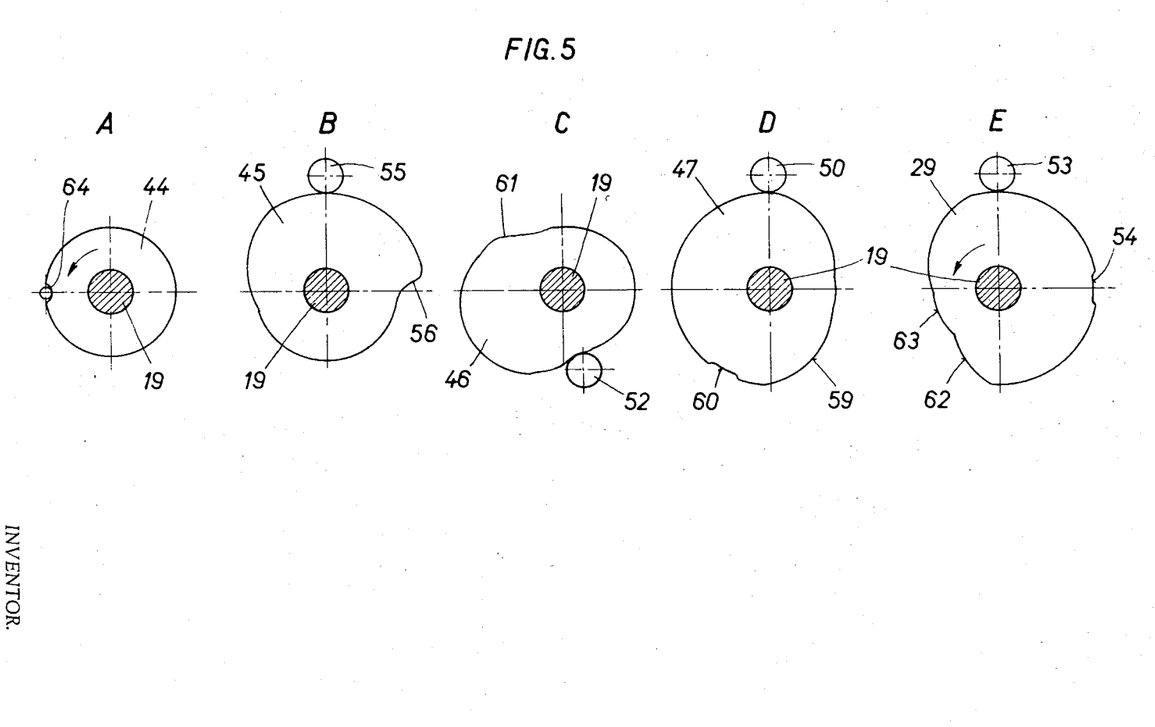
FIG. 5 which incorporates the individual sub-figures 5A–5E, schematically illustrates the cam means used in the control device of FIG. 4.

FIG. 4 illustrates a front view of the carriage 16 in which there is housed or accommodated the control device or mechanism 5. In fact, FIG. 4 has been illustrated on an enlarged scale with respect to the showing of FIG. 1. In particular, it will be observed that mounted upon a cam shaft 19 which piercingly extends through the carriage 16, are a cam disk 44 serving to control a magnetic clutch or coupling 43, a cam disk 45 for actuating the piston pump unit 21, a cam disk pair 46, 47 for displacing the slide member 34, a suction lifting cam 29 and a gear 48 which cooperates with a non-illustrated worm driven by the drive motor via the magnetic coupling 43. All of these elements which are arranged at the cam shaft 19 are mounted rigidly thereon for rotation therewith.

Figure 6:
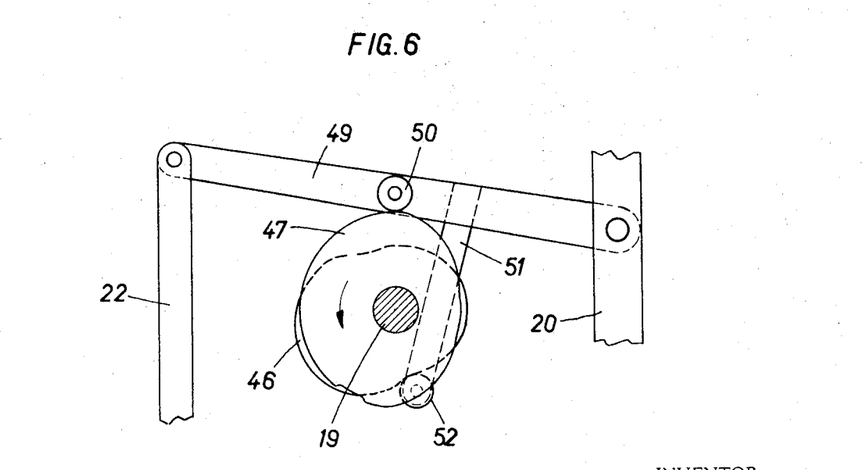
FIG. 6 illustrates a portion of the control device used for actuating a slide mechanism of the magazine.

FIG. 6 illustrates those components of the control device 5 which serve as elements for moving or displacing the slide member 34. According to the arrangement of FIG. 2, by virtue of the up and down movement of the multiple-flexed or bent rod member 40 the slide member 34 is moved to-and-fro with respect to the magazine 3. The upper end of this multiple-flexed rod member 40 is operatively coupled with a lever arm member 49 which is pivotably mounted at the support or holder rod 20. A first roller or roll member 50 itself arranged at this lever arm 49 cooperates with the cam disk 47, while a second roller or roll member 52 arranged at a strut 51 bears against the cam disk 46. This strut 51 is welded or otherwise suitably attached to the lever arm member or lever arm 49.

By means of the cam disk 46 and the roller 52, the lever arm 49, during rotation of the cam shaft 19 in counterclockwise direction, is downwardly pivoted or rocked and by means of the cam disk 47 and the roller 50 this lever arm 49 is thereafter again upwardly pivoted, resulting in an appropriate displacement of the slide member 34 with respect to the magazine or supply means 3.

The configuration of the individual cam disks and the arrangement of the rollers or cam followers cooperating therewith have been shown in FIGS. 5A–5E, with the illustrated positions representing the starting positions for these components. The function of the entire installation is described hereinafter.

In the starting position of the equipment or installation where it is ready for operation the drive motor 4 is switched-on. The cam shaft 19, however, is not yet driven because a non-illustrated reversing switch controlled by the cam disk or cam plate 44 is switched in such a manner that the magnetic clutch or coupling 43 is ineffectual and a brake contained therein is switched-in. By means of a non-visible contact at the balance or weighing device, which briefly closes when the weighing operation has been completed, there is caused release or switching-off of the brake and switching-in of the magnetic clutch or coupling 43. Thereafter, the cam shaft 19, together with all of the cam disks arranged thereon begins to rotate. Through the action of the cam disk 44 the aforementioned reversing switch is thrown or activated and the cam shaft rotates further until after completing one revolution thereof the mentioned reversing switch is again thrown back into its first position.

The cam disk 46 downwardly rocks the lever arm member 49, whereby the multiple-flexed rod member 40 is urged downwardly and the slide member 34, viewed in the showing of FIG. 2, is displaced towards the right. Consequently, slide member 34 entrains the lowermost label carrier or support located in the recess 35 of the slide member 34 and conveys such label carrier beneath the suction lifting device 6. This activity occurs after a rotation of the cam shaft 19 through approximately 90°.

During this first phase of rotation of the cam shaft 19 the suction lifting device 6 remains in a somewhat elevated position with respect to the height of the slide member 34, because the suction lifting cam means 29 will be seen to possess a constant radius through the first quarter of its peripheral extent. Only shortly prior to completion of the first quarter turn does the cam follower 53 associated with this suction lifting cam 29 drop into a small notch or cut-out 54 of such cam 29, resulting in the suction lifting device 6 itself lowering onto the thus delivered label carrier or support.

Just as was the case for the previously considered cam disk 29 the cam disk 45 also possesses a constant radius throughout the first quarter of its peripheral extent or arc, so that during this phase of rotation of the cam shaft 19 the piston pump unit 21 is not actuated. At the same time as the cam follower or roller 53 drops into the cut-out or notch 54 the cam follower or roller 55 cooperating with the cam disk 45 rolls down a steep flank or cam portion 56 of the cam disk 45. As a result, a non-visible spring arranged within the piston pump unit 21 downwardly urges the piston rod 57 and further downwardly rocks or pivots a single-arm lever 58 in clockwise direction. At the suction side of the piston pump unit 21 there prevails a negative pressure which is transmitted via the hose connection 26 to the suction lifting device 6. As a result, the label carrier or support located in the corresponding shaped recess 35 is subjected to this suction action by the suction lifting device 6.

The cut-out or notch 54 provided at the suction lifting cam 29 extends through an angle of rotation of a few degrees so that the suction lifting device 6 again raises somewhat from the slide member 34, causing the label carrier or support to be entrained by such suction lifting device. Now, the cam disk 47 comes into play, which owing to the ascending flank portion or cam surface 59 again retracts the recess 35 of the slide member 34 back into the magazine 3. The cam disk 47 possesses a small cut-out or recess 60 while the remainder of its peripheral surface will be understood to possess a constant or uniform radius. The cam disk 46 possesses a bulge or protruding portion 61 at the location of its periphery corresponding to the aforementioned cut-out or recess 60. This bulge 61 and the cut-out or recess 60 ensure that the slide member 34, after reaching its starting position, will be briefly jarred back-and-forth in order to ensure that the next label support stacked within the magazine 3 will positively slide down into the receiving recess 35 of this slide member 34.

After rotation of the cam shaft through somewhat more than 180° the slide member 34 has reached its starting position and the cam follower or roller 53 rolls down the steep flank or cam portion 62 of the suction lifting cam 29, so that the suction lifting device 6 together with the sucked-up label carrier will be downwardly rocked and such will then be pressed against the price label or tag located at the bonding or adhesive location 1. Following the steep flank portion 62 of the suction lifting cam 29 there is a cam portion 63 of constant radius which extends over a path approximating an angle of rotation of about 45°, so as to ensure that the label carrier or support, during a predetermined time interval, will be positively pressed against the price tag or label, thereby guaranteeing proper adhesion or bonding action of the adhesive material.

During the last quarter of the suction lifting cam 29 the radius thereof again gradually increases, so that the suction lifting device 6 again returns back into its starting position. Also the radius of the cam disk 45 likewise increases in the last quarter of its peripheral extent, so that the piston rod 57 of the piston pump unit 21 again moves upwardly, resulting in the previously generated negative pressure being balanced-out and the suction lifting device 6 now releasing the label carrier which at this time has been provided with the price tag or label. Such during the upward movement, has also imparted thereto a horizontal component of acceleration so that it does not fall downwardly back onto the bonding location 1, rather drops down towards the left thereof with respect to FIG. 1.

After a complete revolution of the cam shaft 19 the cam follower or roller associated with cam disk 44 again arrives in the single recess 64 provided at this cam disk 44. As a result, the magnetic clutch or coupling is switched-off and the brake is again rendered effectual. The cam shaft 19 is now stationary and the apparatus is again ready for carrying out a new work cycle.

Figure 7:
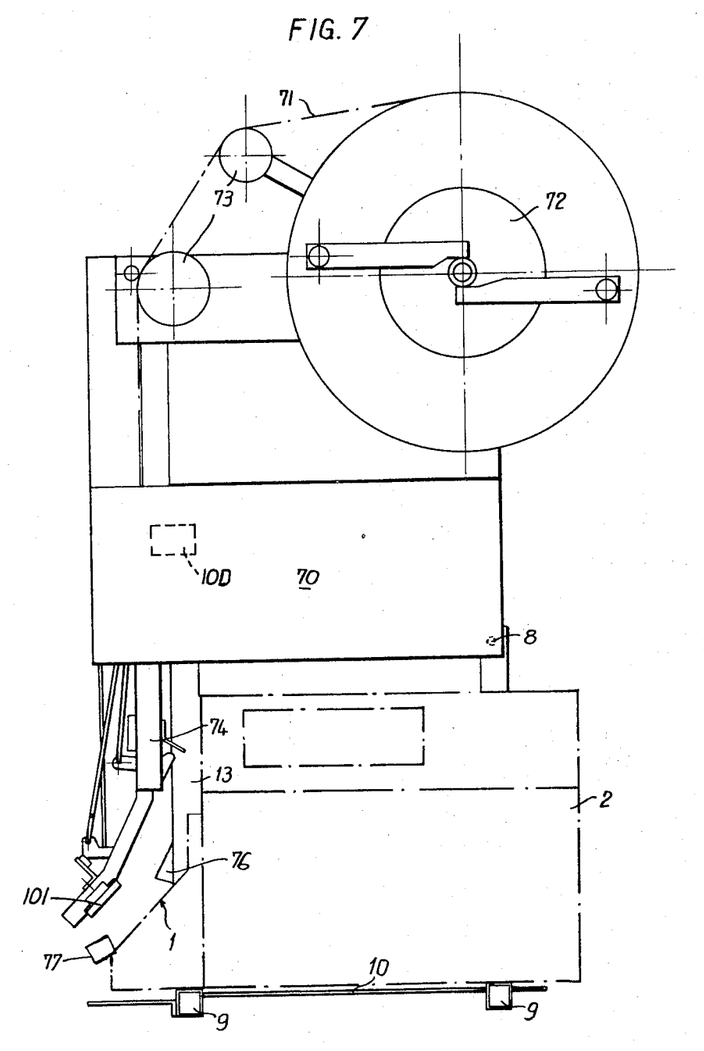
FIG. 7 schematically illustrates in side view a second embodiment of mechanism for delivery of label supports to the bonding location of price tags or labels printed by a balance or weighing device again illustrated in phantom lines.
Figure 8:
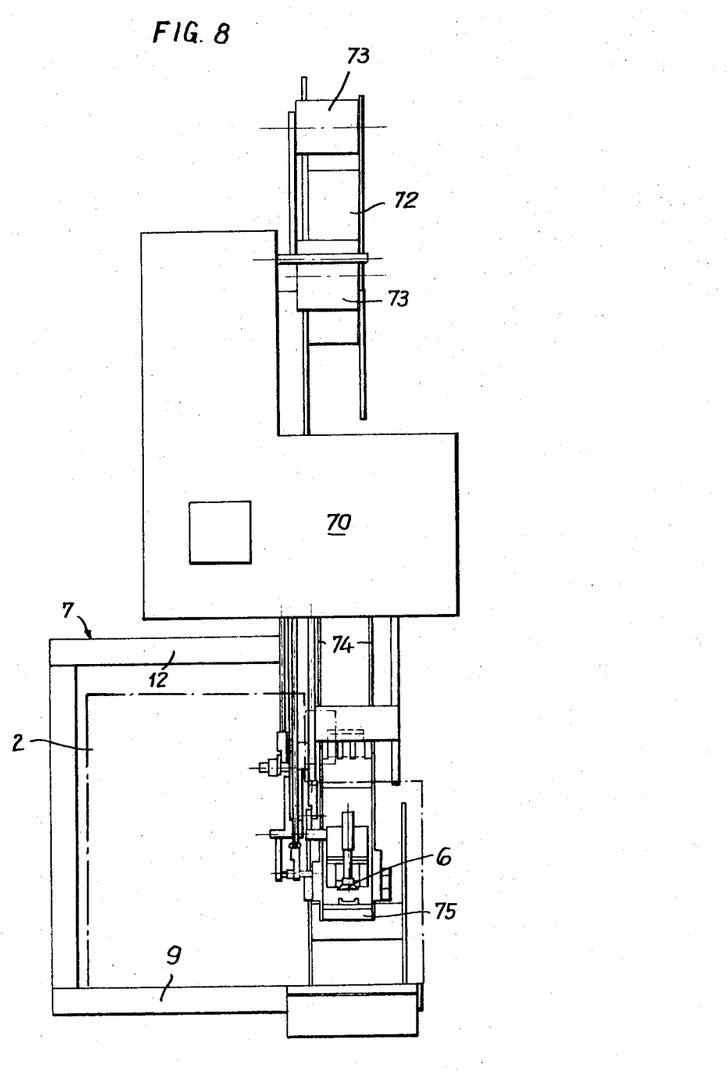
FIG. 8 is a front view of the arrangement of FIG. 7.

The modified version of equipment depicted in FIGS. 7 and 8 differs from the above-described arrangement primarily in the fact that it is designed for the delivery of label carriers to the bonding location, which carriers have been withdrawn and separated from a roller.

Once again, the apparatus of FIGS. 7 and 8 will be seen to comprise a mechanism for delivery of the individual label carriers or supports to the bonding location 1 for the price tags or labels printed by the balance or weighing device 2. Furthermore, this mechanism is again, just as was the case with the preceding embodiment, displaceable upon a frame unit 7 (FIG. 8) perpendicular to the plane of FIG. 7 or to the left of FIG. 8 relative to the bonding location 1 and mounted to be pivotable about a shaft member 8 parallel to the plane of the drawing of FIG. 7.

The control device which controls the delivery of individual label carriers at the region of the bonding or adhesion location 1 and the pressing of the label carriers or supports against a price tag or label activated at the adhesion or bonding location is accommodated in a housing 70. Once again, this control device will be understood to comprise a drive motor and a cam shaft having a number of cams for releasing and controlling the different course of movements required during a work cycle of the equipment and in the correct time sequence. As this structure has been fully considered in conjunction with the preceding embodiment of FIGS. 1–6, no further explanation is now given.

The label carriers or supports are detachably connected with respect to one another into a strip member 71 which is wound upon a spool 72 and are stepwise withdrawn from such spool 72. The strip 71 is guided away from the spool 72 through the agency of deflecting rollers 73 into the housing 70, in which there is located a schematically indicated cutting or separating mechanism 100 synchronously actuated in accordance with the work cycle, this cutting mechanism during each actuation thereof separating a label carrier or support from the strip 71. Each label support which has been separated in this manner then slides under the action of gravity into a guide 74 to the region of the adhesive bonding location 1 and a suction lifting device 6. At the end of the guide 74 there is located a stop 75 against which comes to bear the label support sliding down the guide 74 at the direct neighborhood of the suction cup 101 of the suction lifting device 6 and the adhesive bonding location 1. Directly thereafter, and during the next working operation and by means of an appropriate cam controlled approximately in the manner described with respect to the embodiment of FIGS. 1 to 6, a negative pressure is generated at the suction lifting device 6 and the suction cup 101 thereof is guided up to the label carrier. After the label carrier or support has been held against the suction lifting device 6 the support and guide means 74, 75 is approximately rocked or pivoted and the label carrier is briefly pressed through the agency of the rod arrangement of the suction lifting device 6 against the price tag or label which is disposed in its preparatory position at the adhesive bonding location 1. During the next working operation, the label support together with the price label adhering thereto, in other words, the finished price shield, is now raised via the suction cup of the suction lifting device 6 from the bonding location 1 and during the return stroke the suction lifting device 6 is vented so that the price shield drops down onto a removal location disposed in front of the bonding location 1, this dropping down movement being undertaken such that the price shield experiences a horizontal displacement component by virtue of the return stroke of the suction lifting device. Consequently, the apparatus is then in a preparatory state for carrying out a new work cycle.

The arrangement of FIGS. 7 and 8 has the advantage with regard to the arrangement of FIGS. 1 through 6 that it is not necessary to refill any label carriers or supports during a longer period of time since a roller can contain a considerably larger number of label carriers or supports than for instance a supply magazine 3. Also, disturbances in operation owing to jamming of stacked label carriers with one another cannot occur with the type of equipment described in FIGS. 7 and 8.

Since, as previously mentioned, a heating element for activating the adhesive layer of the printed price tags or labels is provided at the adhesive bonding location 1 and the label carriers or supports are preferably formed of plastic an apparatus suitable for the purposes of the invention ensures that a label carrier cannot be pressed against the heating element when a price tag or label is not located thereon. To this end, there can be provided a schematically illustrated light barrier, as best shown by referring to FIG. 7. This light barrier can consist of a light source 76 which transmits light rays to the bonding location 1 and a photoelectric or photocell 77 which responds to the light rays reflected from the bonding location. If a price tag or label is located at the bonding location 1 then a great deal of light is reflected and the apparatus can start-up without obstruction. On the other hand, if no price tag or label is located at the bonding location 1, then only a small amount of light is reflected and start-up of the apparatus is suppressed.

The light source and the photocell of the light barrier can be located at opposite sides of the path of movement of the price tags or labels so that the apparatus only then starts into operation when a price tag is conveyed to the bonding location. In similar manner, in lieu of such photoelectric barrier, there can also be provided a mechanical barrier at the movement path of the price tag which, in the same manner, is actuated by a price tag or label moving through this movement or displacement path, releasing or triggering the running of a work cycle for the delivery of a label carrier to this price tag or label.

The last-mentioned modification of the equipment utilizing photoelectric or mechanical barriers arranged in the path of movement of the price tags or labels to the bonding location possesses the advantage that the apparatus already begins to startup before the price tags have reached the bonding location. As a result, the price tags or labels need not remain longer than necessary at the heating element arranged at the bonding location. Consequently, it is ensured that the price tags or labels are not over-heated and assume a brown discoloration.

While there is shown and described present preferred embodiments of the invention, it is to be distinctly understood that the invention is not limited thereto but may be otherwise variously embodied and practiced within the scope of the following claims. Accordingly,

What is claimed is:

1. A method for the fabrication of price shields or the like consisting of a price label printed by a balance and a price label support, comprising the steps of individually placing label supports at the region of a price label-delivery location, said label supports having means for attachment to an irregularly shaped article, retaining the thus delivered label support at such delivery location in a holder until a price label has been printed by the balance, delivering a printed price label from the balance to this delivery location, and thereafter guiding together the label support and the price label and uniting same with one another by pressing such label support and price label against one another to thus form a price shield, ejecting the thus formed price shield in the vicinity of said article being processed, and attaching said price shield to said article.

2. The method as defined in claim 1, further including the step of stacking said label supports in a retaining magazine, individually removing the label supports from said magazine in which they were stacked and guiding such individually removed label supports to the region of said price label-delivery location.

3. The method as defined in claim 1, further including the step of providing said label supports in roll form, removing the label supports from said roll, delivering such removed label supports to a processing location, and separating at such processing location individual label supports which are then guided to the region of said price label-delivery location.

4. The method as defined in claim 2 wherein the step of individually removing the label supports from a magazine is carried out by applying a suction force to retain said supports in an overlying position to said delivered printed label, automatically sensing the overlying placement of said printed label with respect to said label carrier and uniting said label support and printed label.

References Cited
UNITED STATES PATENTS

| | | | |
|---|---|---|---|
| 3,594,258 | 7/1971 | Dullinger | 156—570 |
| 3,729,362 | 4/1973 | French et al. | 156—363 X |
| 2,741,389 | 4/1956 | Carter | 156—352 X |
| 3,262,831 | 7/1966 | Ziegler et al. | 156—277 X |
| 3,291,675 | 12/1966 | Orloff et al. | 156—277 X |
| 3,367,822 | 2/1968 | Hoffler | 156—363 X |
| 3,372,079 | 3/1968 | Fellner et al. | 156—363 X |
| 3,607,579 | 9/1971 | Enskat et al. | 156—553 X |
| 3,577,296 | 5/1971 | Phillips et al. | 156—277 X |
| 3,291,675 | 12/1966 | Orloff et al. | 156—277 X |
| 3,536,550 | 10/1970 | Von Hofe | 156—64 X |
| 3,662,511 | 5/1972 | Eliasberg | 156—277 X |

HAROLD ANSHER, Primary Examiner

U.S. Cl. X.R.

156—300, 363, 570